United States Patent [19]

Jones

[11] Patent Number: 5,552,760
[45] Date of Patent: Sep. 3, 1996

[54] METHOD OF DETECTING A DEFLATED TIRE ON A VEHICLE

[75] Inventor: David Jones, Lichfield, England

[73] Assignee: Sumitomo Rubber Industries, Ltd., Hyogo-ken, Japan

[21] Appl. No.: 316,488

[22] Filed: Oct. 3, 1994

[30] Foreign Application Priority Data

Oct. 9, 1993 [GB] United Kingdom ............... 9320821

[51] Int. Cl.$^6$ ................................... B60C 23/00
[52] U.S. Cl. ................... 340/444; 73/146.5; 340/442
[58] Field of Search ...................... 340/442, 444, 340/671, 443; 73/146.5, 146.2

[56] References Cited

U.S. PATENT DOCUMENTS

| | | | |
|---|---|---|---|
| 4,876,528 | 10/1989 | Walker et al. | 73/146.5 |
| 5,192,929 | 3/1993 | Walker et al. | 340/442 |
| 5,218,862 | 6/1993 | Hurrell, II et al. | 73/146.5 |
| 5,239,469 | 8/1993 | Walker et al. | 73/146.5 |
| 5,248,957 | 9/1993 | Walker et al. | 364/565 |
| 5,252,946 | 10/1993 | Walker et al. | 340/444 |
| 5,345,217 | 9/1994 | Prottey | 340/442 |

FOREIGN PATENT DOCUMENTS

| | | |
|---|---|---|
| 0489562 | 6/1992 | European Pat. Off. |
| 0497120 | 8/1992 | European Pat. Off. |
| 0552827 | 7/1993 | European Pat. Off. |
| 0564285 | 10/1993 | European Pat. Off. |
| 0607690 | 7/1994 | European Pat. Off. |

*Primary Examiner*—Brent A. Swarthout
*Attorney, Agent, or Firm*—Birch, Stewart, Kolasch & Birch, LLP.

[57] ABSTRACT

A method of detecting a deflated tire on a vehicle by comparing the rolling radii of the tires by comparing angular velocity speed signals C1, C2, C3, and C4 from wheel speed sensors, one at each wheel, comprising the steps of: calculating in normal driving an error value DEL'; determining a correction factor LAT, by calculating from the four angular velocity values respective first, second, third and fourth deciding factors MC1, MC2, MC3, MC4; summing the four deciding factors and multiplying this sum by a centralizing constant (K) to give a central deciding factor MPSD and selecting the correction factor LAT according to pre-determined rules; determining vehicle related constants A, B, C for clockwise cornering and E, F, G for anti-clockwise cornering; calculating a corrected error value DEL; and operating a tire warning indicator to indicate that at least one tire is deflated when the magnitude of the corrected error value DEL is sensed in the range 0.05 to 0.5.

35 Claims, 4 Drawing Sheets

METHOD OF DETECTING A DEFLATED TIRE ON A VEHICLE

This invention relates to a method of detecting a deflated tire on a vehicle suitable for cars, trucks or the like.

BACKGROUND OF THE INVENTION

Prior applications such as French Patent Publication No 2568519 and European Patent Publication No 291 217 propose using wheel speed signals from the vehicle wheels such as for example the signals from an anti-lock braking system which are multi-pulse signals of typically 48 to 96 pulses per revolution of each wheel. The prior art system compares the speed derived signals in various ways, and also attempt to overcome errors due to vehicle factors such as cornering, braking, accelerating, uneven or changing loads, which can cause changes in the speed signals which are larger than those caused by a tire deflation of for example 0.4 bar.

French Patent Publication 2568519 avoided errors of this type by monitoring the speeds of the diagonally opposed pairs of wheels for a long time or distance period so that it averaged out effectively cornering of the vehicle. The result however was that the device operated very slowly taking many Kilometers to sense a pressure loss.

European Patent Publication No 291 217 improved the situation by calculating the lateral and longitudinal acceleration of the vehicle using the same four wheel speed signals and setting fixed limits above which the detection system was inhibited to avoid false signals due to cornering and acceleration. This inhibition of detection however meant that for a proportion of the time of vehicle running the system was not sensing punctures, the actual proportion depending upon the type of roads and the way the vehicle was being driven.

The real difficulty with these types of systems is that, apart from the lateral acceleration of the vehicle which occurs during cornering causing increased deflection of the outer pair of wheels compared to the inner pair of wheels, each vehicle has different characteristics due to the position of the center of gravity and the type of suspension and these different characteristics when cornering produce additional deflections in the outer pairs of tires with regard to the inner pairs of tires.

However the vehicle characteristics make the tire deflections different in each of the tires. Similar problems occur due to vehicle characteristics in the deflections in the front pair of tires compared to the rear pair when the vehicle brakes, and vice-versa when the vehicle accelerates.

SUMMARY OF THE INVENTION

It is an object of the present invention to provide a method of detecting a deflated tire on a vehicle which accommodates the above changes, avoiding false signals and detecting deflation for substantially all the time when the vehicle is running.

According to one aspect of the present invention there is provided a method of detecting a deflated tire on a vehicle by comparing the rolling radii of the tires by means of comparing angular velocity speed signals C1, C2, C3 and C4 from wheel speed sensors one at the left-hand front, right-hand front, left-hand rear and right-hand rear wheel positions respectively, comprising the step of calculating in normal driving an error value (DEL') where $$DEL' = \frac{[(C1+C4)/2 - (C2+C3)/2]}{(C1+C2+C3+C4)/4} \times 100,$$

determining a correction factor (LAT), by calculating from the four angular velocity values C1, C2, C3 and C4 respective first, second, third and fourth deciding factors (MC1, MC2, MC3, MC4) where MC1=C1
MC2=C2/[(C2+C4)/(C1+C3)]
MC3=C3/[(C3+C4)/(C1+C2)]
MC4=C4/[[(C2+C4)/(C1+C3)]×[(C3+C4)/(C1+C2)]], then summing the four deciding factors and multiplying this sum by a centralizing constant (K) to give a central deciding factor (MPSD) and selecting the correction factor (LAT) as follows, if the first or second deciding factor (MC1 or MC2) is greater than the central deciding factor (MPSD) then $$LAT=2\times(C3-C4)\times(C1+C2+C3+C4),$$

if the third or fourth deciding factor (MC3 or MC4) is greater than the central deciding factor (MPSD) then $$LAT=2\times(C1-C2)\times(C1+C2+C3+C4),$$

or if none of the deciding factors (MC1, MC2, MC3 or MC4) is greater than the central deciding factor (MPSD) then $$LAT=(C1+C3-C2-C4)\times(C1+C2+C3+C4),$$

calculating a corrected error value (DEL), and operating a tire warning indicator provided in the vehicle to indicate that at least one tire is deflated when it is sensed that the magnitude of the corrected error value (DEL) is in the range 0.05 to 0.5, characterized by the step of determining vehicle related constants A, B, C for clockwise cornering and E, F G for anti-clockwise cornering by a setup procedure from sets of values (SV1–SVn n=2,3,4 . . . ) of C1–C4 obtained by driving the vehicle respectively clockwise and anti-clockwise with its four tires inflated to their normal scheduled pressure around a circle at a plurality of n constant speeds, and then calculating the corrected error value (DEL) by DEL=DEL'−DELCOR where DELCOR=

$$(E \times LAT)+(F \times LAT^2)+(G \times LAT^3)$$

if the sign of the correction factor LAT is negative or DELCOR=

$$(A \times LAT)+(B \times LAT^2)+(C \times LAT^3)$$

if the sign of the correction factor LAT is positive.

The vehicle related constants A,B,C,E,F,G may be determined by any suitable mathematical, statistical or graphical method.

For example the vehicle related constants may be determined by calculating for each set of values (SVn) of C1–C4 the average speed ASPDn of the vehicle where ASPDn=(C1n+C2n+C3n+C4n)/4, the vehicle setup lateral acceleration SETUPACCLAT where SETUPACCLATn=(C1N+C3n−C2n−C4n)×ASPDn, the actual setup lateral acceleration SETUPLAT where SETUPLATn=SETUPACCLATn/(KPHFAC×KPHFAC) where KPHFAC is the number of wheel speed signals per wheel speed sensor per unit of speed, the vehicle setup error value SETUPDEL where SETUPDELn=(C1n+C4n−C2n−C3n)×50/ASPDn and then for each set of values SVn calculating the curvilinear regression equation of vehicle setup error value SETUPDEL on the actual setup lateral acceleration SETUPLAT and setting the vehicle related constants A and E, B and F, and C and G equal to respectively the coefficients of the linear, square and cubic terms of SETUPLAT for the clockwise and anti-clockwise data respectively. The vehicle related constants may also be determined by calculating the quotient SETUPQOT of the setup error value SETUPDEL divided by the vehicle setup lateral acceleration SETUPACCLAT where SETUPQOTn=SETUPDELn/SETUPACCLATn and then calculating the curvilinear regression equation of the quotient SETUPQOT on the actual setup acceleration SETUPLAT and setting the vehicle related constants A and E, B and F, and C and G equal respectively to the coefficients of the constant, linear and square terms of SETUPLAT for the clockwise and anti-clockwise data respectively.

The unit of speed for calculating KPHFAC may be 1 kph.

Alternatively, the vehicle related constants may be determined graphically by plotting for each of the sets of values SVn the curve of SETUPQOT against the actual setup lateral acceleration SETUPLAT and then taking the values of the vehicle related constants A and E to be equal to the intercepts of the curve on the SETUPQOT axis for the clockwise and anti-clockwise data respectively and then plotting graphically for each set of values SVn the quotient of (SETUPQOT–A) or (SETUPQOT–E) divided by SETUPLATn against SETUPLAT, drawing the best straight line through the graphical points according to a suitable method and then taking the vehicle related constants B and F to be equal to the intercept of the best straight line on the (SETUPQOT–A) or (SETUPQOT–E) axis and taking the vehicle related constants C and G to be equal to the slope of the best straight line for the clockwise and anti-clockwise data respectively.

In the graphical method the best straight line may be drawn through the data points by the Method of Least Squares.

Preferably the tire warning indicator is operated when the magnitude of the corrected error value is in the range 0.05 to 0.2.

The centralizing constant used in the derivation of the central deciding factor MPSD may be in the range of 0.250125 to 0.250625 and preferably has a value of 0.25025.

The particular tire which is deflated may be detected by calculating for each wheel a deflation indicating factor IMC1, IMC2, IMC3 and IMC4 respectively and then selecting the factor having the largest numerical value, the deflation indicating factors being calculated as follows: IMC1= C1 if the first deciding factor (MC1) is greater than the central deciding factor (MPSD) then

IMC2=C2/[((C4/C3)/2)+0.5]

IMC3=C3/[((C4/C2)/2)+0.5]

IMC4=C4/[[((C4/C3)/2)+0.5]×[((C4/C2)/2)+0.5]];

if the second deciding factor (MC2) is greater than the central deciding factor (MPSD) then

IMC2=C2/[((C4/C3)/2)+0.5]

IMC3=C3/[((C3/C1)/2+0.5]

IMC4=C4/[[((C4/C3)/2)+0.5]×[((C3/C1)/2+0.5)]];

if the third deciding factor (MC3) is greater than the central deciding factor (MPSD) then

IMC2=C2/[((C2/C1)/2)+0.5]

IMC3=C3/[((C4/C2)/2)+0.5]

IMC4=C4/[[((C2/C1)/2)+0.5]×[((C4/C2)/2)+0.5]];

if the fourth deciding factor (MC4) is greater than the central deciding factor (MPSD) then

IMC2=C2/[((C2/C1)/2)+0.5]

IMC3=C3/[((C3/C1)/2)+0.5]

IMC4=C4/[[((C2/C1)/2)+0.5]×[((C3/C1)/2)+0.5]];

or if none of the deciding factors (MC1, MC2, MC3, MC4) is greater than the central deciding (MPSD) factor then

IMC2=C2/[(((C2+C4)/(C1+C3))/2)+0.5]

IMC3=C3/[(((C3+C4)/(C1+C2))/2)+0.5]

IMC4=C4/[[(((C3+C4)/(C1+C2))/2)+0.5]×[((C2+C4)/C1+C3))/2)+0.5]].

More preferably for each wheel W of the vehicle a wheel factor FAC(W),W=1,2,3,4 is determined by calculating an error value DEL'FAC(W) for each wheel when driving the vehicle in a straight line at 120 Kph with the tire of that wheel deflated by 0.6 bar below the scheduled pressure whilst the other tires are maintained at their scheduled pressure where DEL'FAC=(C1+C4–C2–C3)×50/((C1+C2+C3+C4)/4) and the wheel factor FAC(W) for each wheel is calculated by dividing the error value DEL'FAC(W) for each wheel by the error value DEL'FAC(1) for the left-hand front wheel number 1, i.e. FAC(W)=DEL'FAC(W)/DEL'FAC(1) and if the value of the corrected error value DEL divided by the wheel factor FAC(W) for the wheel having numerically the greater deflation indicating factor (IMC1–IMC4) is in the range 0.05 to 0.5 then operating a tire warning indicator provided in the vehicle to indicate that wheel has a deflated tire.

Whilst the invention in fact compares the angular velocities of the wheels it should be understood that this can be done by comparing the times for one full turn of each wheel or by comparing digital signals for multipulse wheel speed generators.

To allow for tires from different manufacturers which may therefore be of different sizes an initialization procedure may be carried out. This monitors the signals under normal driving conditions and enables constants for each wheel to be determined to allow for variations.

BRIEF DESCRIPTION OF THE DRAWINGS

Further aspects of the present invention will become apparent from the following description, by way of example only, of one embodiment in conjunction with the attached diagrammatic drawings in which.

DETAILED DESCRIPTION OF THE INVENTION

Figure 1:
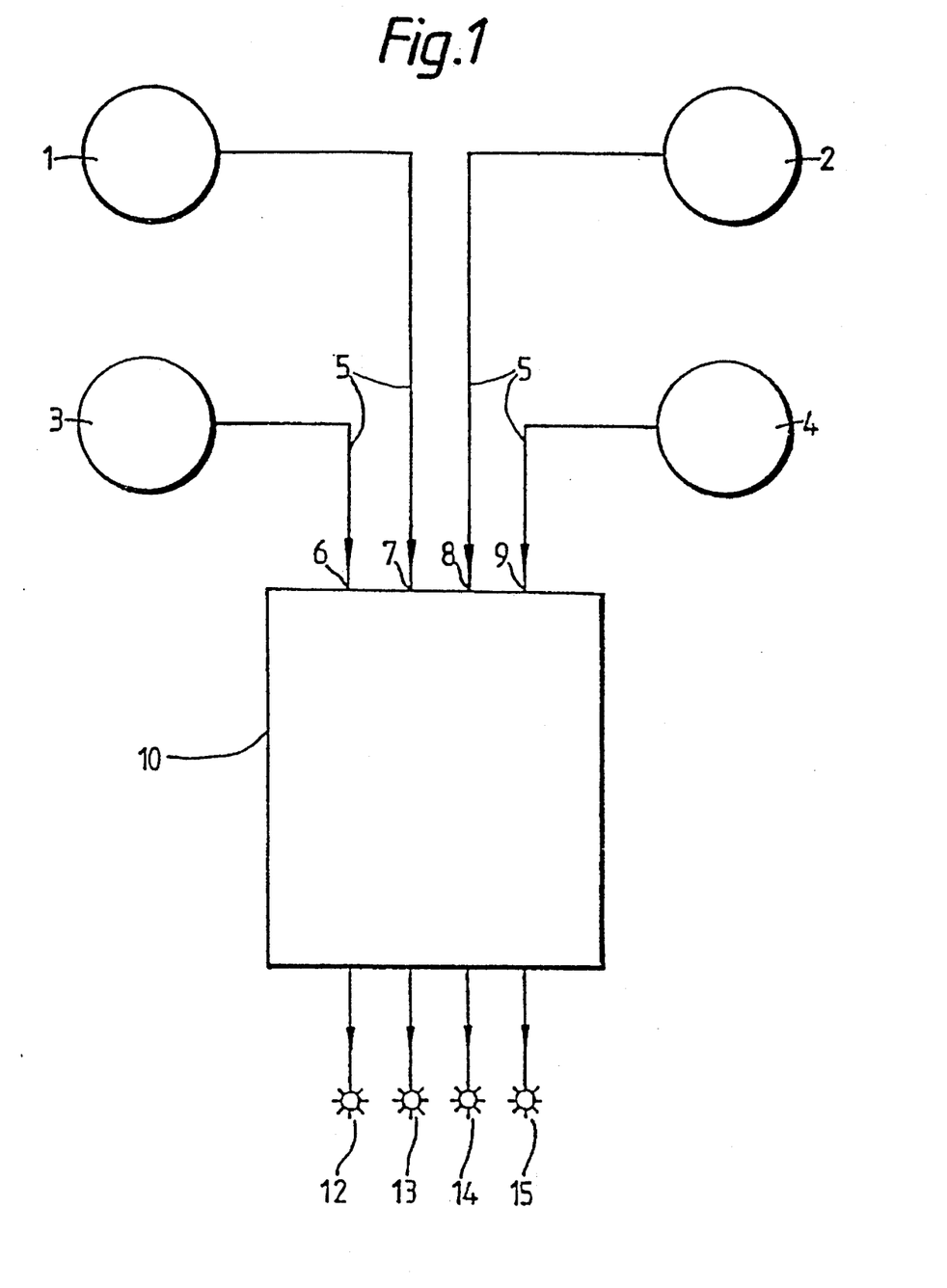
FIG. 1 is a schematic diagram showing a deflation warning device for a car having four wheels.

The apparatus shown in FIG. 1 provides a deflation warning device for a vehicle having four wheels 1, 2, 3 and 4. Wheels 1 and 2 are the left- and right-hand front wheels respectively and wheels 3 and 4 are the left- and right-hand rear wheels respectively. Each wheel has a toothed wheel device associated with it of the type designed and fitted to provide a digital signal comprising a magnetic pick-up of the type used for a vehicle anti-skid system of the electronic type—often commonly known as ABS braking system. Each pick-up is additionally connected in this case to a deflation warning detection system which uses the same digital signal as the ABS system.

The electronic signals from each of the four wheels are carried through cables 5 to four separate inputs 6, 7, 8 and 9 of a central processing unit 10. Four separate indicator lights 12, 13, 14 and 15 are provided one for each wheel 1, 2, 3 and 4. These indicator lights may be most conveniently mounted on the vehicle dashboard.

The central processing unit 10 is basically a microprocessor which monitors the four signals and compares them to determine if an outward signal is to be sent to operate an indicator light to warn of a deflated tire. In the case where the vehicle already has an ABS system fitted then the microprocessor 10 may be the same microprocessor as the ABS system. Alternatively a separate microprocessor may be provided.

The respective values of the total digital pulse signals from each of the wheels 1, 2, 3 and 4 in a five second period are C1, C2, C3 and C4 respectively. The central processing unit 10 computes these frequency values as will be described below to determine whether or not to send a deflation warning signal to one of the warning lights 12, 13, 14 or 15.

Figure 2:
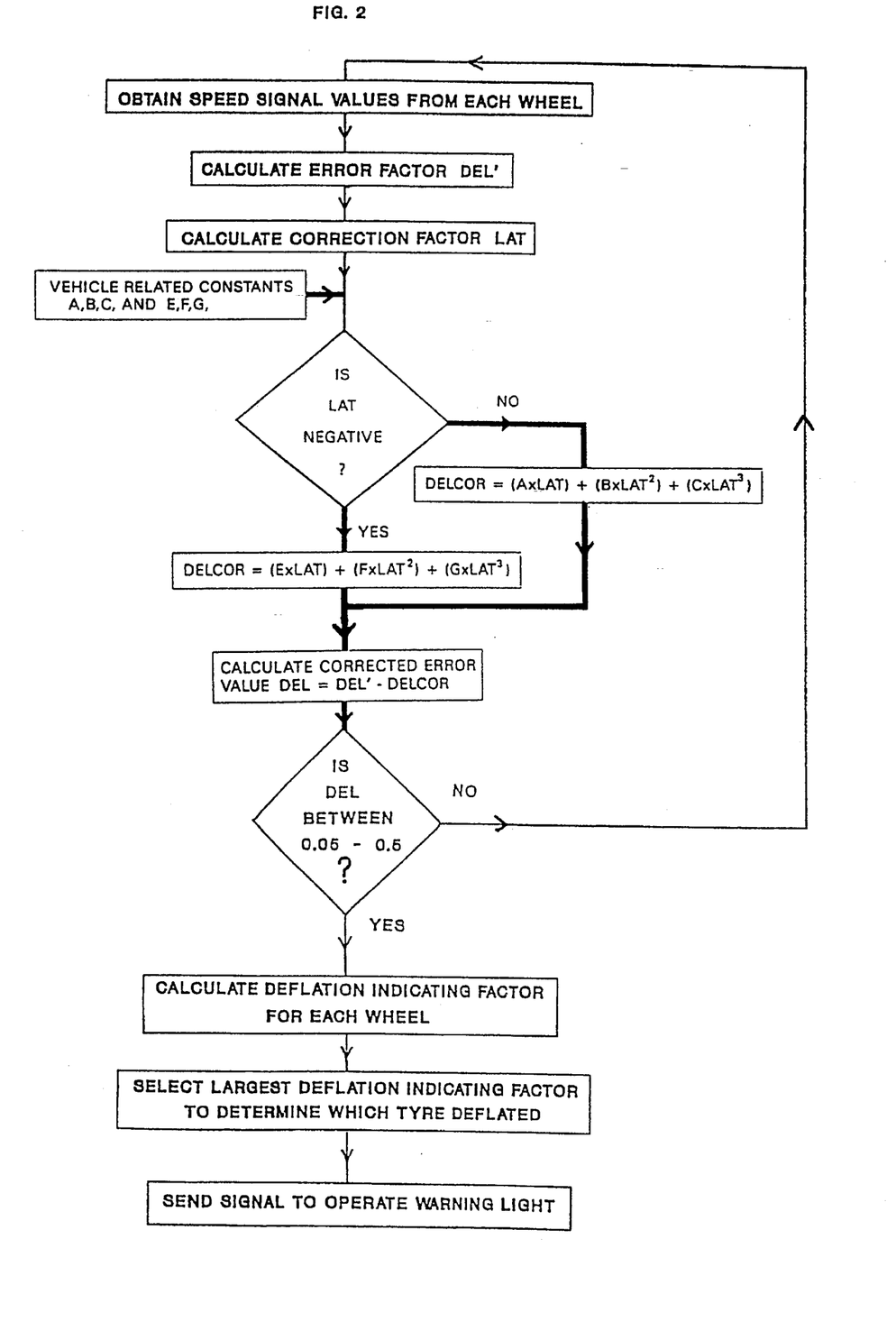
FIG. 2 is a schematic diagram showing the sequence of computations used to determine if a deflated tire exists and decide which one is deflated.

The sequence of operations used in this computation is shown schematically in FIG. 2.

Figure 4:
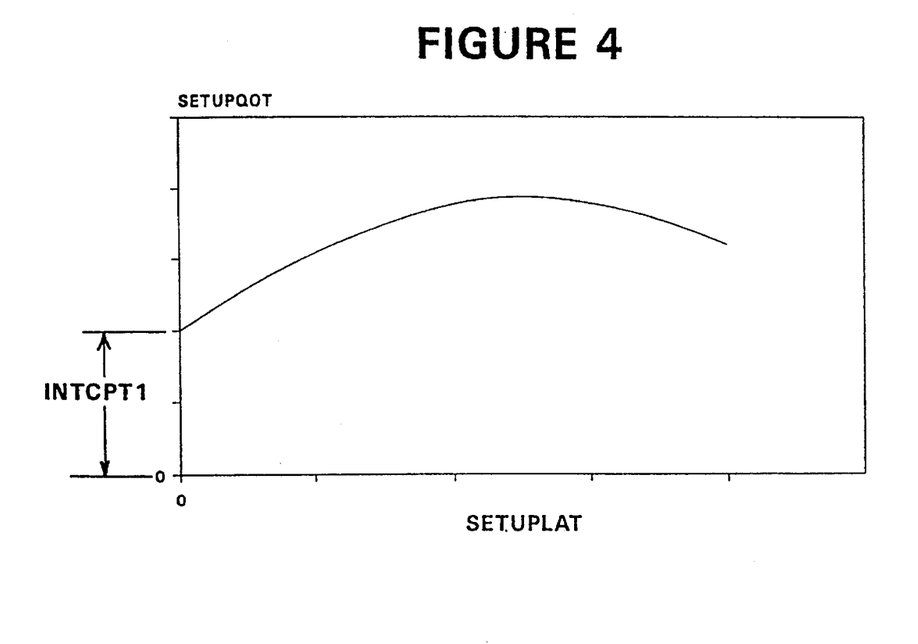
FIG. 4 shows the graphical determination of vehicle related constants A and E.
Figure 5:
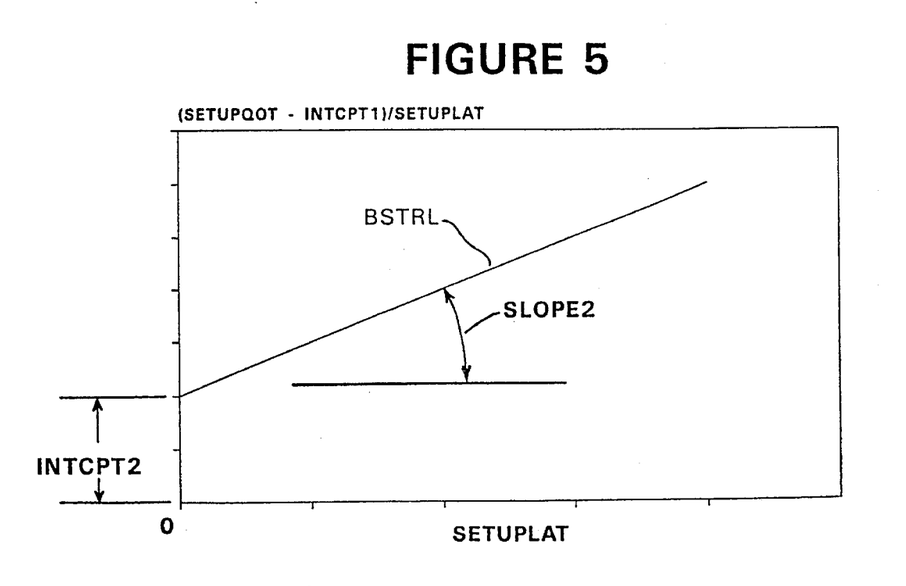
FIG. 5 shows the graphical determination of vehicle related constants B and C and F and G.

The first operation in the method of the invention is to determine by a setup procedure vehicle related constants A, B, C for clockwise cornering and E, F G for anti-clockwise cornering from sets of values (SV1–SVn, n=2,3,4 . . . ) of C1–C4 when the vehicle is turning respectively clockwise and anti-clockwise with its four tires inflated to their normal scheduled pressure around a circle at a plurality of constant speeds. Speeds which have been used start at 20 kph and increase in intervals of 5 kph, i.e. SV1 is measured at 20 kph and SVn is measured at 20+(5×(n−1))kph. The determination of the vehicle related constants proceeds by calculating for each set of values (SVn) of C1–C4 the average speed ASPDn of the vehicle where ASPDn=(C1n+C2n+C3n+C4n)/4, the vehicle setup lateral acceleration SETUPAC-CLAT where SETUPACCLATn=(C1n+C3n−C2n−C4n)×ASPDn, the actual setup lateral acceleration SETUPLAT where SETUPLATn=SETUPACCLATn/(KPHFAC×KPHFAC) where KPHFAC is the number of signals per wheel speed sensor per 1 kph and a vehicle setup error value SETUPDEL where SETUPDELn=(C1n+C4n−C2n−C3n)×50/ASPDn. Then for each set of values SVn is calculated a quotient SETUPQOT of the setup error value SETUPDEL divided by the vehicle setup lateral acceleration SETUPAC-CLAT where SETUPQOTn=SETUPDELn/SETUPAC-CLATn. The next step is then to plot graphically for each of the sets of values SVn the value of SETUPQOT against the actual setup lateral acceleration SETUPLAT. This is shown in FIG. 4. The values of the vehicle related constants A and E are then taken to be equal to the intercepts (INTCPT1) of the curve on the SETUPQOT axis for the clockwise and anti-clockwise data respectively. The next step is then to plot graphically for each set of values SVn the quotient of (SETUPQOT−A) or (SETUPQOT−E) divided by SETUPLATn against SETUPLATn. This is shown in FIG. 5. The method then proceeds by drawing the best straight line (BSTRL) through the graphical points according to the method of least squares or any other suitable method and then taking the vehicle related constants B and F to be equal to the intercept (INTCPT2) of the best straight line on the (SETUPQOT−A) or (SETUPQOT−E) axis and taking the vehicle related constant C and G to be equal to the slope (SLOPE2) of the best straight line for the clockwise and anti-clockwise data respectively. A detailed description of the method of least squares can be seen for example in "Statistics for Technologists", Chapter X, Paradine and Rivett, first published 1953 by English Universities Press Limited, London.

Alternatively the values of the vehicle related constants may be determined mathematically. One such method is by deriving curvilinear regression equation relating SETUPDEL to SETUPLAT and setting the pairs of constants A and E, B and F, and c and G equal to respectively the coefficients of the linear, square and cubic terms in SETUPLAT for the clockwise and anti-clockwise data respectively. Another such method is by deriving the curvilinear regression equation of SETUPQOT on SETUPLAT and then setting the pairs of constants A and E, B and f, and C and G equal to respectively the constant term and the coefficients of the linear and squared terms in SETUPLAT for the clockwise and anticlockwise data respectively.

The second step in the method is to calculate from the actual wheel speed values C1–C4 in normal driving an error value DEL' where $$DEL' = \frac{[(C1+C4)/2 - (C2+C3)/2]}{(C1+C2+C3+C4)/4} \times 100$$

However because the actual wheel speed values may be distorted due to vehicle factors such as cornering, braking, accelerating or uneven loads which give rise to a greater effect than that caused by a tire deflation it is necessary to correct this calculated error value to remove these vehicle effects.

Figure 3:
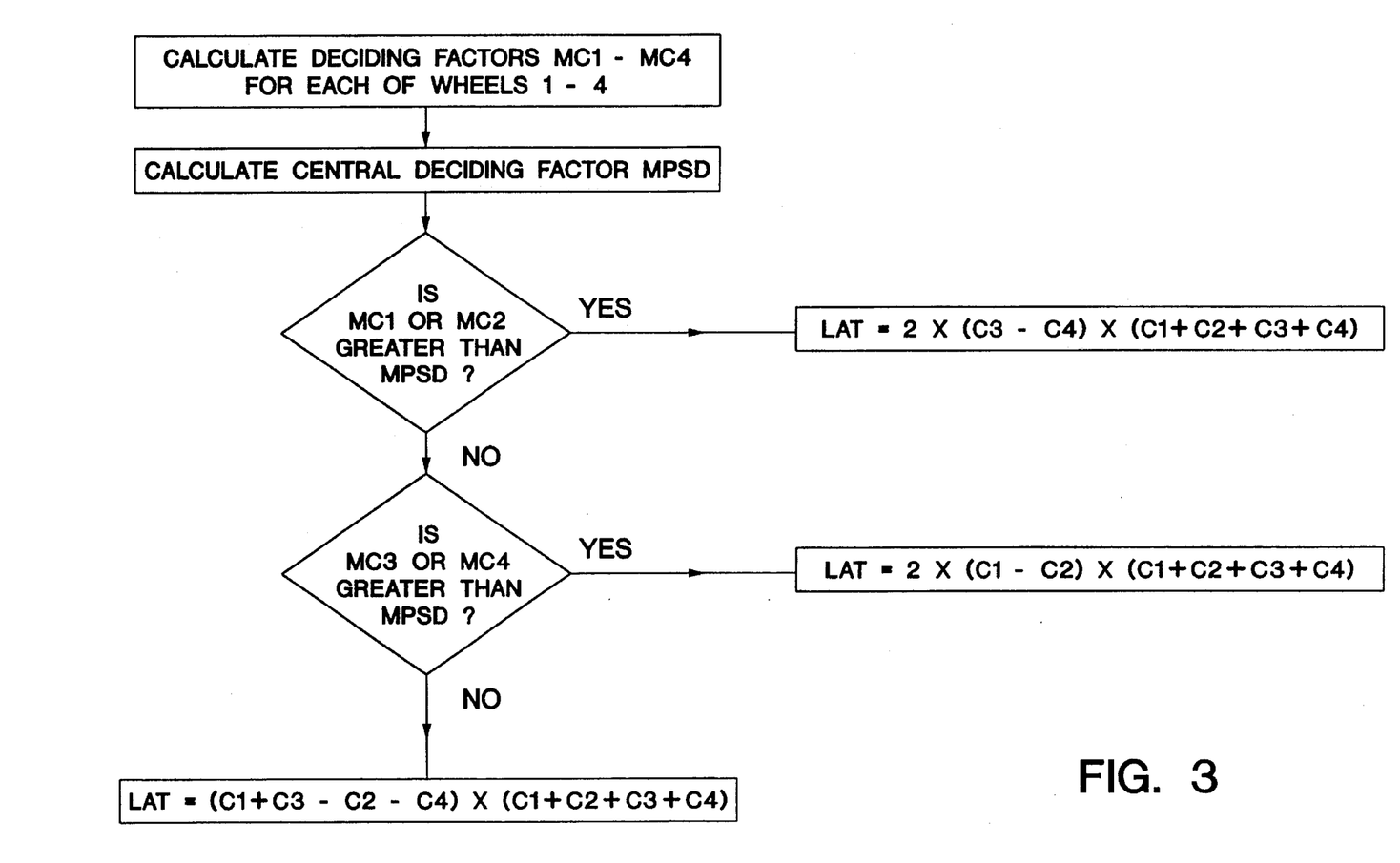
FIG. 3 is a schematic diagram showing the sequence of computations used in determining the correction factor LAT.

To correct the error value DEL' a correction factor LAT is calculated according to the magnitude of respective deciding factors MC1–MC4 for each wheel in comparison to a central deciding factor MPSD. The central deciding factor is equal to the sum for the four deciding factors MC1–MC2 multiplied by a centralizing constant K which in this embodiment is selected to be 0.25025. The value of the correction factor LAT is then calculated depending on which if any of the four deciding factors MC1–MC4 is greater in magnitude than the central deciding factor MPSD as follows:

MC1=C1

MC2=C2/[(C2+C4)/(C1+C3)]

MC3=C3/[(C3+C4)/(C1+C2)]

MC4=C4/[[(C2+C4)/(C1+C3)]×[(C3+C4)/(C 1+C2)]], then summing the four deciding factors and multiplying this sum by a centralizing constant (K) to give a central deciding factor (MPSD) and selecting the correction factor (LAT) as follows, if the first or second deciding factor (MC1 or MC2) is greater than the central deciding factor (MPSD) then $$LAT=2\times(C3-C4)\times(C1+C2+C3+C4)/4,$$

if the third or fourth deciding factor (MC3 or MC4) is greater than the central deciding factor (MPSD) then $$LAT=2\times(C1-C2)\times(C1+C2+C3+C4)/4,$$

or if none of the deciding factors (MC1, MC2, MC3 or MC4) is greater than the central deciding factor (MPSD) then $$LAT=(C1+C3-C2-C4)\times(C1+C2+C3+C4)/4.$$

This sequence of operations is shown in FIG. 3.

The calculated error value DEL' is then corrected to remove vehicle effects to give a corrected error value DEL according to the following equation:

$$DEL = DEL' - DELCOR$$

wherein if the sign of the correction factor LAT is negative then DELCOR=

$$(E \times LAT) + (F \times LAT^2) + (G \times LAT^3) \text{ else } DELCOR =$$

$$(A \times LAT) + (B \times LAT^2) + (C \times LAT^3).$$

Having calculated the corrected error value DEL the central processing unit 10 then decides if the value of DEL is in the range of 0.05 to 0.5 which indicates the presence of a deflated tire.

Values of DEL below 0.05 are the result of minor statistical variation in the counts from each wheel whereas values of DEL greater than 0.5 indicate a relatively uncommon occurrence such as wheel spin or a locked wheel and are greater than the effect of a punctured tire.

If the central processing unit 10 finds that the corrected error value is between 0.05 and 0.5 then the method of the invention moves on to the next stage which is to determine which tire is deflated. Otherwise the system continues to monitor wheel speeds.

To determine which tire is deflated the central processing unit 10 calculates for each wheel a deflation indicating factor IMC1–IMC4. These factors are calculated according to the following procedure:

IMC1=C1 if the first deciding factor (MC1) is greater than the central deciding factor (MPSD) then

IMC2=C2/[((C4/C3)/2)+0.5]

IMC3=C3/[((C4/C2)/2)+0.5]

IMC4=C4/[[((C4/C3)/2)+0.5]×[((C4/C2)/2)+0.5]];

if the second deciding factor (MC2) is greater than the central deciding factor (MPSD) then

IMC2=C2/[((C4/C3)/2)+0.5]

IMC3=C3/[((C3/C1)/2+0.5]

IMC4=C4/[[((C4/C3)/2)+0.5]×[((C3/C1)/2+0.5)]];

if the third deciding factor (MC3) is greater than the central deciding factor (MPSD) then

IMC2=C2/[((C2/C1)/2)+0.5]

IMC3=C3/[((C4/C2)/2)+0.5]

IMC4=C4/[[((C2/C1)/2)+0.5]×[((C4/C2)/2)+0.5]];

if the fourth deciding factor (MC4) is greater than the central deciding factor (MPSD) then

IMC2=C2/[((C2/C1)/2)+0.5]

IMC3=C3/[((C3/C1)/2)+0.5]

IMC4=C4/[[((C2/C1)/2)+0.5]×[((C3/C1)/2)+0.5]];

or if none of the deciding factors (MC1, MC2, MC3, MC4) is greater than the central deciding (MPSD) factor then

IMC2=C2/[(((C2+C4)/(C1+C3))/2)+0.5]

IMC3=C3/[(((C3+C4)/(C1+C2))/2)+0.5]

IMC4=C4/[[(((C3+C4)/(C1+C2))/2)+0.5]×[(((C2+C4)/C1+C3))/2)+0.5]].

Thus having obtained a deflation indicating factor for each of the four wheels the central processing unit compares these to determine which wheel has the factor of the largest magnitude. A signal is then sent to operate the indicator light corresponding to that wheel in order to alert the driver that the tire concerned has deflated. In a preferred arrangement the warning signal is only sent after three sets of deflation indicating factors, calculated from successive sets of wheel speed data, all indicate that a particular tire is deflated.

In a preferred method the corrected error factor DEL is further corrected for differences between each of the four wheels 1–4 by dividing its value by a wheel factor FAC(1)–FAC(4) for the particular wheel which is indicated as having a deflated tire.

The wheel factor FAC(W),W=1,2,3,4 is determined by calculating an error value DEL'FAC(W) for each wheel when driving the vehicle in a straight line at a constant speed, for example 120 kph, with the tire of that wheel deflated by 0.6 bar below the scheduled pressure whilst the other tires are maintained at their scheduled pressure where DEL'FAC=(C1+C4−C2−C3)×50/((C1+C2+C3+C4)/4) and the wheel factor FAC(W) for each wheel is calculated by dividing the error value DEL'FAC(W) for each wheel by the error value DEL'FAC(1) for the left-hand front wheel number 1, i.e. FAC(W)=DEL'FAC(W)/DEL'FAC(1).

Then if the value of the corrected error value DEL divided by the wheel factor FAC(W) for the wheel having numerically the greater deflation indicating factor (IMC1–IMC4) is in the preset range of 0.05 to 0.5 or 0.1 to 0.3 then the tire warning indicator provided in the vehicle is operated to indicate that the particular wheel has a deflated tire.

Whilst the above embodiment has illustrated the method of the invention using the signal data from a multi-toothed wheel system typically producing 48 or 96 pulses per wheel revolution the invention can equally be used with other wheel speed sensing systems. For example the method may be used with a simple system which uses a single pulse per revolution to compute the time period for one rotation of each wheel, in which case it will be necessary to multiply the wheel speeds by a constant factor to obtain data in the necessary form.

Also while the above embodiment has described the calculation of a wheel factor FAC(W) for each wheel W by dividing the error value DEL'FAC(W) of each wheel W by the error value DEL'FAC(1) of wheel 1, other values of FAC(W), which relate the values of DEL'FAC(W) to each other can be used, obtained for example by dividing the error values of the wheels by the error value of wheels 2, 3 or 4.

Having now described my invention what I claim is:

1. A method of detecting a deflated tire on a vehicle comprising the steps of:

rotating each tire of the vehicle;

providing one wheel speed sensor for each of the tires;

detecting the angular velocity speed of the tires by the wheel speed sensors;

comparing the rolling radii of the tires by means of comparing angular velocity speed signals C1, C2, C3 and C4 from wheel speed sensors one at the left-hand front, right-hand front, left-hand rear and right-hand rear wheel positions respectively, characterized by calculating in normal driving an error value (DEL') where $$DEL' = \frac{[(C1 + C4)/2 - (C2 + C3)/2]}{(C1 + C2 + C3 + C4)/4} \times 100,$$

determining a correction factor (LAT), by calculating from the four angular velocity values C1, C2, C3 and C4 respective first, second, third and fourth deciding factors (MC1, MC2, MC3, MC4) where

MC1=C1

MC2=C2/[C2+C4)/(C1+C3)]

MC3=C3/[(C3+C4)/(C1+C2)]

MC4=C4/[(C2+C4)/(C1+C3)]×[(C3+C4)/(C1+C2)]], then summing the four deciding factors and multiplying this sum by a centralizing constant (K) to give a central deciding factor (MPSD) and selecting the correction factor (LAT) as follows, if the first or second deciding factor (MC1 or MC2)

is greater than the central deciding factor (MPSD) then $$LAT=2\times(C3-C4)\times(C1+C2+C3+C4),$$

if the third or fourth deciding factor (MC3 or MC4) is greater than the central deciding factor (MPSD) then $$LAT=2\times(C1-C2)\times(C1+C2+C3+C4),$$

or if none of the deciding factors (MC1, MC2, MC3 or MC4) is greater than the central deciding factor (MPSD) then $$LAT=(C1+C3-C2-C4)\times(C1+C2+C3+C4);$$

determining vehicle related constants A, B, C for clockwise cornering and E, F, G for anti-clockwise cornering by a setup procedure from sets of values (SV1–SVn n=2,3,4 . . . ) of C1–C4 obtained by driving the vehicle respectively clockwise and anti-clockwise with its four tires inflated to their normal scheduled pressure around a circle at a plurality of n constant speeds;

calculating a corrected error signal (DEL) wherein
DEL=DEL'–DELCOR
where DELCOR=$(E\times LAT)+(F\times LAT^2)+(G\times LAT^3)$ if the sign of the correction factor LAT is negative, or
DELCOR=$(A\times LAT)+(B\times LAT^2)+(C\times LAT^3)$ if the sign of the correction factor LAT is positive;

outputting a warning signal when a magnitude of the corrected error signal is in the range 0.05 to 0.5; and operating a tire warning indicator provided in the vehicle indicating that at least one tire is deflated when said warning signal is output.

2. The method of detecting a deflated tire on a vehicle according to claim 1, wherein the vehicle related constants A, B, C for clockwise cornering and E, F, G for anti-clockwise cornering are determined by calculating for each set of values (SVn) of C1–C4 the average speed ASPD of the vehicle where ASPD=(C1+C2+C3+C4)/4, the vehicle setup lateral acceleration SETUPACCLAT where SETUPACCLAT=/C1+C3 –C2–C4)×ASPD, the actual setup lateral acceleration SETUPLAT where SETUPLAT=SETUPACCLAT/(KPHFAC×KPHFAC) where KPHFAC is the number of wheel speed signals per wheel speed sensor per unit of speed, the vehicle setup error value SETUPDEL where SETUPDEL=(C1+C4 –C2–C3)×50/ASPD and then for each set of values SVn calculating the curvilinear regression equation of vehicle setup error value SETUPDEL on the actual setup lateral acceleration SETUPLAT and setting the vehicle related constants A and E, B and F, and C and G equal to respectively coefficients of linear, square and cubic terms of SETUPLAT for the clockwise and anti-clockwise data, respectively.

3. The method of detecting a deflated tire on a vehicle according to claim 1 wherein the vehicle related constants A, B, C, for clockwise cornering and E, F, G for anti-clockwise cornering are determined by calculating for each set of values (SVn) of C1–C4 the average speed ASPD of the vehicle where ASPD=(C1+C2+C3+C4)/4, the vehicle setup lateral acceleration SETUPACCLAT where SETUPACCLAT=(C1+C3–C2–C4)×ASPD, the actual setup lateral acceleration SETUPLAT where SETUPLAT=SETUPACCLAT/(KPHFAC×KPHFAC) where KPHFAC is the number of signals per wheel speed sensor per unit of speed, the vehicle setup error value SETUPDEL where SETUPDEL= (C1+C4–C2–C3)×50/ASPD and then for each set of values SVn calculating the quotient SETUPQOT of the setup error value SETUPDEL divided by the vehicle setup lateral acceleration SETUPACCLAT where SETUPQOT=SETUPDEL/SETUPACCLAT and then calculating the curvilinear regression equation of the quotient SETUPQOT on the actual setup acceleration SETUPLAT and setting the vehicle related constants A and E, B and F, and C and G equal respectively to coefficients of constant, linear and square terms of SETUPLAT for the clockwise and anti-clockwise data, respectively.

4. The method of detecting a deflated tire on a vehicle according to claim 1 wherein the vehicle related constants A, B, C for clockwise cornering and E, F, G for anti-clockwise cornering are determined by calculating for each set of values (SVn) of C1–C4 the average speed ASPD of the vehicle where ASPD=(C1+C2+C3+C4)/4, the vehicle setup lateral acceleration SETUPACCLAT where SETUPACCLAT=(C1+C3–C2–C4)×ASPD, the actual setup lateral acceleration SETUPLAT where SETUPLAT=SETUPACCLAT/(KPHFAC×KPHFAC) where KPHFAC is the number of signals per wheel speed sensor per unit of speed, the vehicle setup error value SETUPDEL where SETUPDEL= (C1+C4–C2–C3)×50/ASPD and then for each set of values Svn calculating the quotient SETUPQOT of the setup error value SETUPDEL divided by the vehicle setup lateral acceleration SETUPACCLAT where SETUPQOT=SETUPDEL/SETUPACCLAT and then plotting graphically the associated values of SETUPLAT and SETUPQOT, drawing a curve to show the interrelationship of SETUPLAT and SETUPQOT and then taking the values of the vehicle related constants A and E to be equal to the intercept INTCPT1 on an SETUPQOT axis of the respective curves for the clockwise and anti-clockwise data and then plotting graphically the quotient of (SETUPQOT–A) divided by SETUPLAT against SETUPLAT and the quotient of (SETUPQOT–E) divided by SETUPLAT against SETUPLAT, drawing the best straight line BSTRL through the graphical points according to a suitable method and then taking the vehicle related constants B and F to be equal to the intercept INTCPT2 of the best straight line BSTRL on (SETUPQOT–A)/SETUPLAT axis and a (SETUPQOT–E)/SETUPLAT axis and taking the vehicle related constants C and G to be equal to the slope SLOPE2 of the best straight line BSTRL for the clockwise and anti-clockwise data, respectively.

5. The method of detecting a deflated tire according to claim 4 wherein the graphical plot of (SETUPQOT–A)/SETUPLAT and (SETUPQOT–E)/SETUPLAT against SETUPLAT, the best straight line is drawn through the data points according to the Method of Least Squares.

6. A method of detecting a deflated tire according to claim 1 wherein the centralizing constant (K) has a value in the range 0.250125 to 0.250625.

7. A method of detecting a deflated tire according to claim 1 wherein the centralizing constant (K) has a value of 0.25025.

8. The method of detecting a deflated tire according to claim 1 comprising carrying out the further step of calculating for each wheel respectively a deflation indicating factor (IMC1, IMC2, IMC3, IMC4), determining the wheel having the numerically greater deflation indicating factor, and producing a deflation warning signal therefor, where the deflation indicating factors are calculated as follows:

IMC1=C1, then
if the first deciding factor (MC1) is greater than
the central deciding factor (MPSD) then
IMC2=C2/[((C4/C3)/2)+0.5]
IMC3=C3/[((C4/C2)/2)+0.5]
IMC4=C4/[[((C4/C3)/2)+0.5]×[((C4/C2)/2)+0.5]];
if the second deciding factor (MC2) is greater than the central deciding factor (MPSD) then IMC2=C2/[((C4/C3)/2)+0.5]
IMC3=C3/[((C3/C1)/2)+0.5]
IMC4=C4/[[((C4/C3)/2)+0.5]×[((C3/C1)/2)+0.5]];
if the third deciding factor (MC3) is greater than the central deciding factor (MPSD) then
IMC2=C2/[((C2/C1)/2)+0.5]
IMC3=C3/[((C4/C2)/2)+0.5]
IMC4=C4/[[((C2/C1)/2)+0.5]×[((C4/C2)/2)+0.5]];
if the fourth deciding factor (MC4) is greater than the central deciding factor (MPSD) then
IMC2=C2/[((C2/C1)/2)+0.5]
IMC3=C3/[((C3/C1)/2)+0.5]
IMC4=C4/[[((C2/C1)/2)+0.5]×[((C3/C1)/2)+0.5]];
or if none of the deciding factors (MC1, MC2, MC3, MC4) is greater than the central deciding (MPSD) factor then
IMC2=C2/[(((C2+C4)/(C1+C3))/2)+0.5]
IMC3=C3/[(((C3+C4)/(C1+C2))/2)+0.5]
IMC4=C4/[[(((C3+C4)/(C1+C2))/2)+0.5]×[(((C2+C4)/(C1+C3))/2)+0.5 ]].

9. The method of detecting a deflated tire according to claim 8 comprising carrying out the further step of determining for each wheel W of the vehicle in turn an error value DEL'FAC(W) by driving the vehicle in a straight line at a chosen constant speed with the tire of that wheel deflated by 0.6 bar below the scheduled pressure with the other tires maintained at their scheduled pressure calculating the error factor using the general formula DEL'FAC (W)=(C1+C4 −C2−C3)×50/((C1+C2+C3+C4)/4); calculating for each wheel W=1, 2, 3 and 4 a wheel factor FAC(W) by dividing the error value DEL'FAC(W) for the respective wheel by the error value DEL'FAC(W) for the left-hand front wheel (W=1), namely according to the general expression FAC (W)=DEL'FAC (W)/DEL'FAC(1); comparing the corrected error value DEL divided by the wheel factor FAC(W) of the wheel having numerically the greater deflation indicating factor (IMC1–IMC4) and if in the range 0.05 to 0.5, operating the tire warning indicator.

10. The method of detecting a deflated tire according to claim 9 wherein the value of DEL'FAC(W) for each wheel W is obtained at a constant speed of 120 kph.

11. The method of detecting a deflated tire according to claim 1 wherein said outputting step is performed when the magnitude of the corrected error signal is in the range 0.1 to 0.3.

12. The method of detecting a deflated tire on a vehicle according to claim 1 wherein the vehicle related constants, A,B,C and E,F,G are determined from n sets of values (SV1–SVn, n=2,3,4 . . . ) of wheel speeds C1–C4 where SV1 is measured at a constant speed of 20 kph and SVn is measured at a constant speed of 20+ (5× (n−1)) kph.

13. The method of detecting a deflated tire on a vehicle according to claim 2 wherein the unit of speed for calculating KPHFAC is 1 kph.

14. A method of detecting a deflated tire on a vehicle comprising the steps of:
rotating each tire of the vehicle;
providing one wheel speed sensor for each of the tires;
detecting the angular velocity speed of the tires by the wheel speed sensors;
comparing the rolling radii of the tires by means of comparing angular velocity speed signals C1, C2, C3 and C4 from wheel speed sensors one at the left-hand front, right-hand front, left-hand rear and right-hand rear wheel positions respectively, characterized by calculating in normal driving an error value (DEL') where $$DEL' = \frac{[(C1+C4)/2 - (C2+C3)/2]}{(C1+C2+C3+C4)/4} \times 100,$$

determining a correction factor (LAT), by calculating from the four angular velocity values C1, C2, C3 and C4 respective first, second, third and fourth deciding factors (MC1, MC2, MC3, MC4) where
MC1=C1
MC2=C2/[(C2+C4)/(C1+C3)]
MC3=C3/[(C3+C4)/(C1+C2)]
MC4=C4/[((C2+C4)/(C1+C3))×((C3+C4)/(C1+C2))]],
then summing the four deciding factors and multiplying this sum by a centralizing constant (K) to give a central deciding factor (MPSD) and selecting the correction factor (LAT) as follows, if the first or second deciding factor (MC1 or MC2) is greater than the central deciding factor (MPSD) then $LAT=2\times(C3-C4)\times(C1+C2+C3+C4),$ if the third or fourth deciding factor (MC3 or MC4) is greater than the central deciding factor (MPSD) then $LAT=2\times(C1-C2)\times(C1+C2+C3+C4),$ or if none of the deciding factors (MC1, MC2, MC3 or MC4) is greater than the central deciding factor (MPSD) then $LAT=(C1+C3-C2-C4)\times(C1+C2+C3+C4);$ determining vehicle related constants A, B, C for clockwise cornering and E, F, G for anti-clockwise cornering by a setup procedure from sets of values (SV1–SVn n=2,3,4 . . . ) of C1–C4 obtained by driving the vehicle respectively clockwise and anti-clockwise with its four tires inflated to their normal scheduled pressure around a circle at a plurality of n constant speeds;
calculating a corrected error signal (DEL) wherein
DEL=DEL'−DELCOR
where DELCOR=(E×LAT)+(F×LAT$^2$)+(G×LAT$^3$)
if the sign of the correction factor LAT is negative, or
DELCOR=(A×LAT)+(B×LAT$^2$)+(C×LAT$^3$)
if the sign of the correction factor LAT is positive;
outputting a warning signal when a magnitude of the corrected error signal is in the range 0.05 to 0.5; and
operating a tire warning indicator provided in the vehicle indicating that at least one tire is deflated when said warning signal is output,
wherein
the vehicle related constants A, B, C for clockwise cornering and E, F, G for anti-clockwise cornering are determined by calculating for each set of values (SVn) of C1–C4 the average speed ASPD of the vehicle where ASPD=(C1+C2+C3+C4)/4, the vehicle setup lateral acceleration SETUPACCLAT where SETUPACCLAT=(C1+C3−C23−C4)×ASPD, the actual setup lateral acceleration SETUPLAT where SETUPLAT=SETUPACCLAT/(KPHFAC×KPHFAC) where KPHFAC is the number of wheel speed signals per wheel speed sensor per unit of speed, the vehicle setup error value SETUPDEL where SETUPDEL=(C1+C4−C2−C3)×50/ASPD and then for each set of values SVn calculating the curvilinear regression equation of vehicle setup error value SETUPDEL on the actual setup lateral acceleration SETUPLAT and setting the vehicle related constants A and E, B and F, and C and G equal to respectively coefficients of linear, square and cubic terms of SETUPLAT for the clockwise and anti-clockwise data, respectively.

15. A method of detecting a deflated tire on a vehicle comprising the steps of:

rotating each tire of the vehicle;

providing one wheel speed sensor for each of the tires;

detecting the angular velocity speed of the tires by the wheel speed sensors;

comparing the rolling radii of the tires by means of comparing angular velocity speed signals C1, C2, C3 and C4 from wheel speed sensors one at the left-hand front, right-hand front, left-hand rear and right-hand rear wheel positions respectively, characterized by calculating in normal driving an error value (DEL') where $$DEL' = \frac{[(C1+C4)/2 - (C2+C3)/2]}{(C1+C2+C3+C4)/4} \times 100,$$

determining a correction factor (LAT), by calculating from the four angular velocity values C1, C2, C3 and C4 respective first, second, third and fourth deciding factors (MC1, MC2, MC3, MC4) where
MC1=C1
MC2=C2/[C2+C4)/(C1+C3)]
MC3=C3/[(C3+C4)/(C1+C2)]
MC4=C4/[((C2+C4)/(C1+C3))×[(C3+C4)/(C1+C2)]], then summing the four deciding factors and multiplying this sum by a centralizing constant (K) to give a central deciding factor (MPSD) and selecting the correction factor (LAT) as follows, if the first or second deciding factor (MC1 or MC2) is greater than the central deciding factor (MPSD) then

LAT=2×(C3−C4)×(C1+C2+C3+C4), if the third or fourth deciding factor (MC3 or MC4) is greater than the central deciding factor (MPSD) then

LAT=2×(C1−C2)×(C1+C2+C3+C4), or if none of the deciding factors (MC1, MC2, MC3 or MC4) is greater than the central deciding factor (MPSD) then

LAT=(C1+C3−C2−C4)×(C1+C2+C3+C4);

determining vehicle related constants A, B, C for clockwise cornering and E, F, G for anti-clockwise cornering by a setup procedure from sets of values (SV1–SVn n=2,3,4 ...) of C1–C4 obtained by driving the vehicle respectively clockwise and anti-clockwise with its four tires inflated to their normal scheduled pressure around a circle at a plurality of n constant speeds;

calculating a corrected error signal (DEL) wherein
DEL=DEL'−DELCOR
where DELCOR=(E×LAT)+(F×LAT²)+(G×LAT³)
if the sign of the correction factor LAT is negative or
DELCOR=(A×LAT)+(B×LAT²)+(C×LAT³)
if the sign of the correction factor LAT is positive;

outputting a warning signal when a magnitude of the corrected error signal is in the range 0.05 to 0.5; and operating a tire warning indicator provided in the vehicle indicating that at least one tire is deflated when said warning signal is output, wherein the vehicle related constants A, B, C, for clockwise cornering and E, F, G for anti-clockwise cornering are determined by calculating for each set of values (SVn) of C1–C4 the average speed ASPD of the vehicle where ASPD=(C1+C2+C3+C4)/4, the vehicle setup lateral acceleration SETUPACCLAT where SETUPACCLAT=(C1+C3−C2−C4)×ASPD, the actual setup lateral acceleration SETUPLAT where SETUPLAT= SETUPACCLAT/(KPHFAC×KPHFAC) where KPHFAC is the number of signals per wheel speed sensor per unit of speed, the vehicle setup error value SETUPDEL where SETUPDEL=(C1+C4−C2−C3)×50/ ASPD and then for each set of values SVn calculating the quotient SETUPQOT of the setup error value SETUPDEL divided by the vehicle setup lateral acceleration SETUPACCLAT where SETUPQOT=SETUPDEL/SETUPACCLAT and then calculating the curvilinear regression equation of the quotient SETUPQOT on the actual setup acceleration SETUPLAT and setting the vehicle related constants A and E, B and F, and C and G equal respectively to coefficients of constant, linear and square terms of SETUPLAT for the clockwise and anti-clockwise data, respectively.

16. A method of detecting a deflated tire on a vehicle comprising the steps of:

rotating each tire of the vehicle;

providing one wheel speed sensor for each of the tires;

detecting the angular velocity speed of the tires by the wheel speed sensors;

comparing the rolling radii of the tires by means of comparing angular velocity speed signals C1, C2, C3 and C4 from wheel speed sensors one at the left-hand front, right-hand front, left-hand rear and right-hand rear wheel positions respectively, characterized by calculating in normal driving an error value (DEL') where $$DEL' = \frac{[(C1+C4)/2 - (C2+C3)/2]}{(C1+C2+C3+C4)/4} \times 100,$$

determining a correction factor (LAT), by calculating from the four angular velocity values C1, C2, C3 and C4 respective first, second, third and fourth deciding factors (MC1, MC2, MC3, MC4) where
MC1=C1
MC2=C2/[C2+C4)/(C1+C3)]
MC3=C3/[(C3+C4)/(C1+C2)]
MC4=C4/[((C2+C4)/(C1+C3))×[(C3+C4)/(C1+C2)]], then summing the four deciding factors and multiplying this sum by a centralizing constant (K) to give a central deciding factor (MPSD) and selecting the correction factor (LAT) as follows, if the first or second deciding factor (MC1 or MC2) is greater than the central deciding factor (MPSD) then

LAT=2×(C3−C4)×(C1+C2+C3+C4), if the third or fourth deciding factor (MC3 or MC4) is greater than the central deciding factor (MPSD) then

LAT=2×(C1−C2)×(C1+C2+C3+C4), or if none of the deciding factors (MC1, MC2, MC3 or MC4) is greater than the central deciding factor (MPSD) then

LAT=(C1+C3−C2−C4)×(C1+C2+C3+C4);

determining vehicle related constants A, B, C for clockwise cornering and E, F, G for anti-clockwise cornering by a setup procedure from sets of values (SV1–SVn n=2,3,4 ...) of C1–C4 obtained by driving the vehicle respectively clockwise and anti-clockwise with its four tires inflated to their normal scheduled pressure around a circle at a plurality of n constant speeds;

calculating a corrected error signal (DEL) wherein
DEL=DEL'–DELCOR
where DELCOR=$(E \times LAT)+(F \times LAT^2)+(G \times LAT^3)$
if the sign of the correction factor LAT is negative, or
DELCOR=$(A \times LAT)+(B \times LAT^2)+(C \times LAT^3)$
if the sign of the correction factor LAT is positive;

outputting a warning signal when a magnitude of the corrected error signal is in the range 0.05 to 0.5; and operating a tire warning indicator provided in the vehicle indicating that at least one tire is deflated when said warning signal is output, wherein
the vehicle related constants A, B, C for clockwise cornering and E, F, G for anti-clockwise cornering are determined by calculating for each set of values (SVn) of C1–C4 the average speed ASPD of the vehicle where ASPD=(C1+C2+C3+C4)/4, the vehicle setup lateral acceleration SETUPACCLAT where SETUPACCLAT=(C1+C3–C2–C4)×ASPD, the actual setup lateral acceleration SETUPLAT where SETUPLAT= SETUPACCLAT/(KPHFAC×KPHFAC) where KPHFAC is the number of signals per wheel speed sensor per unit of speed, the vehicle setup error value SETUPDEL where SETUPDEL=(C1+C4–C2–C3)×50/ASPD and then for each set of values Svn calculating the quotient SETUPQOT of the setup error value SETUPDEL divided by the vehicle setup lateral acceleration SETUPACCLAT where SETUPQOT=SETUPDEL/SETUPACCLAT and then plotting graphically the associated values of SETUPLAT and SETUPQOT, drawing a curve to show the interrelationship of SETUPLAT and SETUPQOT and then taking the values of the vehicle related constants A and E to be equal to the intercept INTCPT1 on an SETUPQOT axis of the respective curves for the clockwise and anti-clockwise data and then plotting graphically the quotient of (SETUPQOT–A) divided by SETUPLAT against SETUPLAT and the quotient of (SETUPQOT–E) divided by SETUPLAT against SETUPLAT, drawing the best straight line BSTRL through the graphical points according to a suitable method and then taking the vehicle related constants B and F to be equal to the intercept INTCPT2 of the best straight line BSTRL on a (SETUPQOT–A)/SETUPLAT axis and a (SETUPQOT–E)/SETUPLAT axis and taking the vehicle related constants C and G to be equal to the slope SLOPE2 of the best straight line BSTRL for the clockwise and anti-clockwise data, respectively.

17. A method of detecting a deflated tire on a vehicle by comparing the rolling radii of the tires by means of comparing angular velocity speed signal values C1, C2, C3 and C4 from wheel speed sensors provided at the left-hand front, right-hand front, left-hand rear and right-hand rear wheels 1–4 respectively comprising the steps of:

driving the vehicle around a circle at a plurality of n constant speeds in both clockwise and anti-clockwise directions with its tires inflated to their normal scheduled pressure to obtain n sets of values SV1 to SVn of the four wheel speed signals C1 to C4 for each direction;

determining for each set of values SVn of the four wheel speed signals C1 to C4 the average speed ASPD of the vehicle by averaging the sum of the four values C1 to C4, the vehicle setup lateral acceleration SETUPACCLAT by subtracting the sum of wheel speed values C2 and C4 from the sum of the wheel speed values C1 and C3 and multiplying the result by the average vehicle speed ASPD, the actual setup lateral acceleration SETUPLAT by dividing the vehicle setup lateral acceleration SETUPACCLAT by the square of the number KPHFAC of wheel speed signals per wheel speed sensor per unit of speed, the vehicle setup error value SETUPDEL by subtracting the sum of wheel speed values C2 and C3 from the sum of wheel speed signals C1 and C4 and multiplying the result by 50 divided by the average vehicle speed ASPD;

calculating for the sets of values SVn of both the clockwise and anti-clockwise direction the curvilinear regression equation of vehicle setup error SETUPDEL on the actual setup lateral acceleration SETUPLAT and setting the values of the pairs of first, second and third vehicle related constants A and E, B and F, and C and G to equal the coefficients of the linear, square and cubic terms respectively of SETUPLAT for the clockwise and anti-clockwise directions respectively;

driving the vehicle normally and repeatedly determining an error value DEL' by subtracting the average of wheel speed values C2 and C3 from the average of wheel speed values C1 and C4, dividing the result by the average of all four wheel speed values C1–C4 and multiplying by 100;

equating a first deciding factor MC1 to the first wheel speed value C1;

determining a second deciding factor MC2 by dividing the second wheel speed value C2 by the quotient of the sum of wheel speed values C2 and C4 divided by the sum of values C1 and C3, determining a third deciding factor MC3 by dividing the third wheel speed value C3 by the quotient of the sum of the third and fourth values C3 and C4 divided by the sum of values C1 and C2, determining a fourth deciding factor MC4 by multiplying the quotient of the sum of values C2 and C4 divided by the sum of values C1 and C3 by the quotient of the sum of values C3 and C4 divided by the sum of values C1 and C2 and then dividing the fourth wheel speed value C4 by this result;

summing the first, second, third and fourth deciding factors MC1–M4 and multiplying this sum by a centralizing constant K having a value in the range 0.250125 to 0.250625 to give a central deciding factor MPSD;

determining the value of a correction factor LAT by comparing the values of the first, second, third and fourth deciding factors MC1, MC2, MC3 and MC4 with the value of the central deciding factor MPSD and in the event that either or both of the first and second deciding factors MC1 and MC2 are greater than the central deciding factor MPSD equating the value of the correction factor LAT with twice the product of the fourth wheel speed value C4 subtracted from the third wheel speed value C3 and multiplied by the sum of all four wheel speed values C1 to C4 or in the event that either or both of the third or fourth deciding factors MC3 and MC4 are greater than the central deciding factor equating the value of the correction factor LAT with twice the product of the second wheel speed value C2 subtracted from the first wheel speed value C1 multiplies by the sum of all four wheel speed values C1 to C4 or in the event that none of the deciding factors MC1 to MC4 are greater than the central deciding factor MPSD then equating the correction factor LAT with the value obtained by subtracting the sum of the second and fourth wheel speed values C2 and C4 from the sum of first and third wheel speed values C1 and C3 and multiplying the result by the sum of all four wheel speed values C1 to C4;

calculating a corrected error value DEL according to the arithmetic sign of the correction factor LAT wherein the corrected error value DEL is equal to the error value DEL' minus the sum of the products of the first vehicle related constant A or E multiplied by the linear value of the correction factor LAT, the second vehicle related factor B or F multiplied by the squared value of the correction factor LAT and the third vehicle related constant C or G multiplied by the cubed value of the correction factor LAT wherein the vehicle related constant A, B, C related to clockwise cornering are used when the value of the correction factor LAT is positive and the vehicle related constant E, F, G related to anti-clockwise cornering are used when the value of the correction factor LAT is negative;

and operating a tire warning indicator provided in the vehicle to indicate that at least one tire is deflated when the magnitude of the corrected error value DEL is in the range of 0.05 to 0.5.

18. A method of detecting a deflated tire on a vehicle by comparing the rolling radii of the tires by means of comparing angular velocity speed signal values C1, C2, C3 and C4 from wheel speed sensors provided at the left-hand front, right-hand front, left-hand rear and right-hand rear wheels 1-4 respectively comprising the steps of:

driving the vehicle around a circle at a plurality of n constant speeds in both constant speeds in both clockwise and anti-clockwise directions with its tires inflated to their normal scheduled pressure to obtain n sets of values SV1 to SVn of the four wheel speed signals C1 to C4 for each direction;

determining for each set of values SVn of the four wheel speed signals C1 to C4 the average speed ASPD of the vehicle by averaging the sum of the four values C1 to C4, the vehicle setup lateral acceleration SETUPACCLAT by subtracting the sum of wheel speed values C2 and C4 from the sum of the wheel speed values C1 and C3 and multiplying the result by the average vehicle speed ASPD, the actual setup lateral acceleration SETUPLAT by dividing the vehicle setup lateral acceleration SETUPACCLAT by the square of the number KPHFAC of wheel speed signals per wheel speed sensor per unit of speed, the vehicle setup error value SETUPDEL by subtracting the sum of wheel speed values C2 and C3 from the sum of wheel speed signals C1 and C4 and multiplying the result by 50 divided by the average vehicle speed ASPD and the quotient SETUPQOT of the setup error value SETUPDEL divided by the vehicle setup lateral acceleration SETUPACCLAT;

calculating for the sets of values SVn of both the clockwise and anti-clockwise direction the curvilinear regression equation of quotient SETUPQOT on the actual setup lateral acceleration SETUPLAT and setting the values of the pairs of first, second and third vehicle related constants A and E, B and F, and C and G to equal the constant, linear, and square terms respectively of SETUPLAT for the clockwise and anti-clockwise directions respectively;

driving the vehicle normally and repeatedly determining an error value DEL' by subtracting the average of wheel speed values C2 and C3 from the average of wheel speed values C1 and C4, dividing the result by the average of all four wheel speed values C1–C4 and multiplying by 100;

equating a first deciding factor MC1 to the first wheel speed value C1;

determining a second deciding factor MC2 by dividing the second wheel speed value C2 by the quotient of the sum of wheel speed values C2 and C4 divided by the sum of values C1 and C3, determining a third deciding factor MC3 by dividing the third wheel speed value C3 by the quotient of the sum of the third and forth values C3 and C4 divided by the sum of values C1 and C2, determining a fourth deciding factor MC4 by multiplying the quotient of the sum of values C2 and C4 divided by the sum of values C1 and C3 by the quotient of the sum of values C3 and C4 divided by the sum of values C1 and C2 and then dividing the fourth wheel speed value C4 by this result;

summing the first, second, third and fourth deciding factors MC1–M4 and multiplying this sum by a centralizing constant K having a value in the range 0.250125 to 0.250625 to give a central deciding factor MPSD;

determining the value of a correction factor LAT by comparing the values of the first, second, third and fourth deciding factors MC1, MC2, MC3 and MC4 with the value of the central deciding factor MPSD and in the event that either or both of the first and second deciding factors MC1 and MC2 are greater than the central deciding factor MPSD equating the value of the correction factor LAT with twice the product of the fourth wheel speed value C4 subtracted from the third wheel speed value C3 and multiplied by the sum of all four wheel speed values C1 to C4 or in the event that either or both of the third or fourth deciding factors MC3 and MC4 are greater than the central deciding factor equating the value of the correction factor LAT with twice the product of the second wheel speed value C2 subtracted from the first wheel speed value C1 multiplies by the sum of all four wheel speed values C1 to C4 or in the event that none of the deciding factors MC1 to MC4 are greater than the central deciding factor MPSD then equating the correction factor LAT with the value obtained by subtracting the sum of the second and fourth wheel speed values C2 and C4 from the sum of first and third wheel speed values C1 and C3 and multiplying the result by the sum of all four wheel speed values C1 to C4;

calculating a corrected error value DEL according to the arithmetic sign of the correction factor LAT wherein the corrected error value DEL is equal to the error value DEL' minus the sum of the products of the first vehicle related constant A or E multiplied by the linear value of the correction factor LAT, the second vehicle related factor B or F multiplied by the squared value of the correction factor LAT and the third vehicle related constant C or G multiplied by the cubed value of the correction factor LAT wherein the vehicle related constant A, B, C related to clockwise cornering are used when the value of the correction factor LAT is positive and the vehicle related constant E, F, G related to anti-clockwise cornering are used when the value of the correction factor LAT is negative;

and operating a tire warning indicator provided in the vehicle to indicate that at least one tire is deflated when the magnitude of the corrected error value DEL is in the range of 0.05 to 0.5.

19. A method of detecting a deflated tire on a vehicle by comparing the rolling radii of the tires by means of comparing angular velocity speed signal values C1, C2, C3 and C4 from wheel speed sensors provided at the left-hand front, right-hand front, left-hand rear and right-hand rear wheels 1–4 respectively comprising the steps of:

driving the vehicle around a circle at a plurality of n constant speeds in both clockwise and anti-clockwise directions with its tires inflated to their normal scheduled pressure to obtain n sets of values SV1 to SVn of the four wheel speed signals C1 to C4 for each direction;

determining for each set of values SVn of the four wheel speed signals C1 to C4 the average speed ASPD of the vehicle by averaging the sum of the four values C1 to C4, the vehicle setup lateral acceleration SETUPACCLAT by subtracting the sum of wheel speed values C2 and C4 from the sum of the wheel speed values C1 and C3 and multiplying the result by the average vehicle speed ASPD, the actual setup lateral acceleration SETUPLAT by dividing the vehicle setup lateral acceleration SETUPACCLAT by the square of the number KPHFAC of wheel speed signals per wheel speed sensor per unit of speed, the vehicle setup error value SETUPDEL by subtracting the sum of wheel speed values C2 and C3 from the sum of wheel speed signals C1 and C4 and multiplying the result by 50 divided by the average vehicle speed ASPD;

calculating the quotient SETUPQOT of the setup error value SETUPDEL divided by the vehicle setup lateral acceleration SETUPACCLAT and then plotting graphically the associated values of SETUPLAT and SETUPQOT, drawing a curve to show the interrelationship of SETUPLAT and SETUPQOT and then taking the values of the vehicle related constants A and E to be equal to the intercept INTCPT1 on an SETUPQOT axis of the respective curves for the clockwise and anti-clockwise data and then plotting graphically the quotient of the vehicle related constant A subtracted from the quotient SETUPQOT divided by SETUPLAT against SETUPLAT and quotient of the vehicle related constant E subtracted from the quotient SETUPQOT divided by SETUPLAT against SETUPLAT, drawing the best straight line BSTRL through the graphical points according to a suitable method and then taking vehicle related constants B and F to be equal to the intercept INTCPT2 of the best straight line BSTRL on a (SETUPQOT–A)/SETUPLAT axis and a (SETUPQOT–E)/SETUPLAT axis and taking the vehicle related constants C and G to be equal to the slope SLOPE2 of the best straight line BSTRL for the clockwise and anti-clockwise data, respectively;

driving the vehicle normally and repeatedly determining an error value DEL' by subtracting the average of wheel speed values C2 and C3 from the average of wheel speed values C1 and C4, dividing the result by the average of all four wheel speed values C1–C4 and multiplying by 100;

equating a first deciding factor MC1 to the first wheel speed value C1;

determining a second deciding factor MC2 by dividing the second wheel speed value C2 by the quotient of the sum of wheel speed values C2 and C4 divided by the sum of values C1 and C3, determining a third deciding factor MC3 by dividing the third wheel speed value C3 by the quotient of the sum of the third and fourth values C3 and C4 divided by the sum of values C1 and C2, determining a fourth deciding factor Me4 by multiplying the quotient of the sum of values C2 and C4 divided by the sum of values C1 and C3 by the quotient of the sum of values C3 and C4 divided by the sum of values C1 and C2 and then dividing the fourth wheel speed value C4 by this result;

summing the first, second, third and fourth deciding factors MC1–M4 and multiplying this sum by a centralizing constant K having a value in the range 0.250125 to 0.250625 to give a central deciding factor MPSD;

determining the value of a correction factor LAT by comparing the values of the first, second, third and fourth deciding factors MC1, MC2, MC3 and MC4 with the value of the central deciding factor MPSD and in the event that either or both of the first and second deciding factors MC1 and MC2 are greater than the central deciding factor MPSD equating the value of the correction factor LAT with twice the product of the fourth wheel speed value C4 subtracted from the third wheel speed value C3 and multiplied by the sum of all four wheel speed values C1 to C4 or in the event that either or both of the third or fourth deciding factors MC3 and MC4 are greater than the central deciding factor equating the value of the correction factor LAT with twice the product of the second wheel speed value C2 subtracted from the first wheel speed value C1 multiplies by the sum of all four wheel speed values C1 to C4 or in the event that none of the deciding factors MC1 to MC4 are greater than the central deciding factor MPSD then equating the correction factor LAT with the value obtained by subtracting the sum of the second and fourth wheel speed values C2 and C4 from the sum of first and third wheel speed values C1 and C3 and multiplying the result by the sum of all four wheel speed values C1 to C4;

calculating a corrected error value DEL according to the arthimetic sign of the correction factor LAT wherein the corrected error value DEL is equal to the error value DEL' minus the sum of the products of the first vehicle related constant A or E multiplied by the linear value of the correction factor LAT, the second vehicle related factor B or F multiplied by the squared value of the correction factor LAT and the third vehicle related constant C or G multiplied by the cubed value of the correction factor LAT wherein the vehicle related constant A, B, C related to clockwise cornering are used when the value of the correction factor LAT is positive and the vehicle related constant E, F, G related to anti-clockwise cornering are used when the value of the correction factor LAT is negative;

and operating a tire warning indicator provided in the vehicle to indicate that at least one tire is deflated when the magnitude of the corrected error value DEL is in the range of 0.05 to 0.5.

20. The method of detecting a deflated tire according to claim 19 wherein the graphical plot of (SETUPQOT-A)/SETUPLAT or (SETUPQOT-E)/SETUPLAT against SETUPLAT the best straight line BSTRL is drawn through the data points according to the Method of Least Squares.

21. The method of detecting a deflated tire according to claims 17, 18 or 19 wherein the centralizing constant (K) has a value of 0.25025.

22. The method of detecting a deflated tire according to any of claim 17 to 19 comprising carrying out the further steps of:

calculating for each wheel 1–4 a deflation indicating factor IMC1, IMC2, IMC3, IMC4 respectively, by setting the deflation indicating factor IMC1 for wheel 1 equal to the wheel speed value C1 of wheel 1;

comparing the value of the first deciding factor MC1 with the value of the central deciding factor MPSD and in the event that the deciding factor MC1 is greater then setting the value of the deflation indicating factor IMC2 of wheel 2 equal to the wheel speed value C2 of wheel 2 divided by half of the quotient of the wheel speed value C4 of wheel 4 divided by the wheel speed value C2 of wheel 2 plus 0.5, setting the value of the deflation indicating factor IMC3 of wheel 3 equal to the wheel speed value C3 of wheel 3 divided by half of the quotient of the wheel speed value C4 of wheel 4 divided by the wheel speed value C2 of wheel 2 plus 0.5, setting the value of the indicating factor IMC4 of wheel 4 equal to the wheel speed value C4 of wheel 4 divided by the product of half of quotient of the wheel speed value C4 of wheel 4 and the wheel speed value C3 of wheel 3 plus 0.5 and half of the quotient of the wheel speed value C4 of wheel 4 and the wheel speed C2 of wheel 2 plus 0.5;

comparing the value of the second deciding factor MC2 with the value of the central deciding factor MPSD and in the event that the deciding factor MC2 is greater then setting the value of the deflation indicating factor IMC2 of wheel 2 equal to the wheel speed value C2 of wheel 2 divided by half of the quotient of the wheel speed value C4 of wheel 4 divided by the wheel speed value C3 of wheel 3 plus 0.5, setting the value of the deflation indicating factor IMC3 of wheel 3 equal to the wheel speed value C3 of wheel 3 divided by half of the quotient of the wheel speed value C3 of wheel 3 divided by the wheel speed value C1 of wheel 1 plus 0.5, setting the value of the indicating factor IMC4 of wheel 4 equal to the wheel speed value C4 of wheel 4 divided by the product of half of quotient of the wheel speed value C4 of wheel 4 and the wheel speed value C3 of wheel 3 plus 0.5 and half of the quotient of the wheel speed value C3 of wheel 3 and the wheel speed C1 of wheel 1 plus 0.5;

comparing the value of the third factor MC3 with the value of the central deciding factor MPSD and in the event that the deciding factor MC3 is greater then setting the value of the deflation indicating factor IMC2 of wheel 2 equal to the wheel speed value C2 of wheel 2 divided by half of the quotient of the wheel speed value C2 of wheel 2 divided by the wheel speed value C1 of wheel 1 plus 0.5, setting the value of the deflation indicating factor IMC3 of wheel 3 equal to the wheel speed value C3 of wheel 3 divided by half of the quotient of the wheel speed value C4 of wheel 4 divided by the wheel speed value 02 of wheel 2 plus 0.5, setting the value of the indicating factor IMC4 of wheel 4 equal to the wheel speed value C4 of wheel 4 divided by the product of half of quotient of the wheel speed value C2 of wheel 2 and the wheel speed value C1 of wheel 1 plus 0.5 and half of the quotient of the wheel speed value C4 of wheel 4 and the wheel speed C2 of wheel 2 plus 0.5;

comparing the value of the fourth factor MC4 with the value of the central deciding factor MPSD and in the event that the deciding factor MC4 is greater then setting the value of the deflation indicating factor IMC2 of wheel 2 equal to the wheel speed value C2 of wheel 2 divided by half of the quotient of the wheel speed value C2 of wheel 2 divided by the wheel speed value C1 of wheel 1 plus 0.5, setting the value of the deflation indicating factor IMC3 of wheel 3 equal to the wheel speed value C3 of wheel 3 divided by half of the quotient of the wheel speed value C3 of wheel 3 divided by the wheel speed value C1 of wheel 1 plus 0.5, setting the value of the indicating factor IMC4 of wheel 4 equal to the wheel speed value C4 of wheel 4 divided by the product of half of quotient of the wheel speed value C2 of wheel 2 and the wheel speed value C1 of wheel 1 plus 0.5 and half of the quotient of the wheel speed value C3 of wheel 3 and the wheel speed C1 of wheel 1 plus 0.5;

comparing the values of the first, second, third and fourth deciding factors MC1, MC2, MC3 and MC4 respectively with the value of the central deciding factor MPSD and in the event that none of the deciding factors is greater then setting the value of the deflation indicating factor IMC2 of wheel 2 equal to the wheel speed value C2 of wheel 2 divided by half of the quotient of the sum of wheel speed values C2 and C4 divided by the sum of wheel speed values C1 and C3 plus 0.5, setting the value of the deflation indicating factor IMC3 of wheel 3 equal to the wheel speed value C3 of wheel 3 divided by half of the quotient of the sum of the wheel speed values C3 and C4 divided by the sum of the wheel speed values C1 and C2 plus 0.5, setting the value of the deflation indicating factor IMC4 of wheel 4 equal to the wheel speed value C4 of wheel 4 by the product of half of the quotient of the sum of wheel speed values C3 and C4 divided by the sum of wheel speed values C1 and C2 plus 0.5 and half of the quotient of the sum of wheel speed values C2 and C4 divided by the sum of wheel speed values C1 and C3 plus 0.5;

determining the wheel having the numerically greater deflation indicating factor, and producing a deflation warning signal for the said wheel.

23. The method of detecting a deflated tire according to claim 22 comprising carrying out the further step of determining for each wheel W of the vehicle in turn an error value DEL'FAC(W) by driving the vehicle in a straight line at a chosen constant speed with the tire of that wheel deflated by 0.6 bar below the scheduled pressure with the other tires maintained at their scheduled pressure calculating the error factor using the general formula DEL'FAC(W)=(C1+C4−C2−C3)×50/((C1+C2+C3+C4)/4);

calculating for each wheel W=1, 2, 3 and 4 a wheel factor FAC(W) by dividing the error value DEL'FAC(W) for the left-hand front wheel (W=1, namely according to the general expressions FAC (W)=DEL'FAC(W)/ DEL'FAC(1);

comparing the corrected error value DEL divided by the wheel factor FAC(W) of the wheel having numerically the greater deflation indicating factor (IMC1–IMC4) and if in the range 0.05 to 0.5, operating the tire warning indicator.

24. The method of detecting a deflated tire according to claim 23 wherein the value of DEL'FAC(W) for each wheel W is obtained by driving the vehicle in a straight line at a constant speed of 120 kph.

25. The method of detecting a deflated tire according to claim 17 wherein the tire warning indicator is operated when it is determined that the magnitude of the corrected error value (DEL) is in the range 0.05 to 0.2.

26. The method of detecting a deflated tire on a vehicle according to claim 17 wherein the vehicle related constants A, B, C and E, F, G are determined from n sets of values (SV1–SVn, n=2,3,4 . . . ) of wheel speeds C1–C4 where SV1 is measured at a constant speed of 20 kph and SVn is measured at a constant speed of 20+ (5× (n−1)) kph.

27. The method of detecting a deflated tire on a vehicle according to claim 17 wherein the unit of speed for calculating KPHFAC is 1 kph.

28. A deflated tire detector comprising:
a plurality of speed sensors each provided for a corresponding tire of a plurality of tires on a vehicle, each of said speed sensors outputting an angular velocity of said corresponding tire;
means for comparing rolling radii of said tires including means for calculating an error signal DEL' where $$DEL' = \frac{[(C1 + C4)/2 - (C2 + C3)/2] \times 100}{(C1 + C2 + C3 + C4)/4}$$

where C1, C2, C3 and C4 are angular velocity output by said speed sensors for left-hand front, right-hand front, left-hand rear and right-hand rear tires of the vehicle, respectively, means for determining a correction factor LAT, means for determining a corrected error signal DEL where $$DEL=DEL'-DELCOR$$

wherein $$DELCOR=(E \times LAT)+(F \times LAT^2)+(G \times LAT^3)$$

if the sign of the correction factor LAT is negative, or $$DELCOR=(A \times LAT)+(B \times LAT^2)+(C \times LAT^3)$$

if the sign of the correction factor LAT is positive, and A, B, C being pre-determined vehicle related constants for clockwise cornering and E, F, G being pre-determined vehicle related constants for anti-clockwise cornering, each of the pre-determined vehicle related constants obtained by driving the vehicle respectively clockwise and anti-clockwise with its four tires inflated to their normal scheduled pressure around a circle at a plurality of n constant speeds, and means for determining when a magnitude of said corrected error signal is in a range 0.05 to 0.5 and for outputting a warning signal in response thereto; and
a warning indicator, receiving said warning signal and providing a warning in accordance therewith.

29. The deflated tire detector according to claim 28, wherein said warning indicator is a light in the vehicle.

30. The deflated tire detector according to claim 28, wherein said warning indicator comprises a plurality of warning indicators, corresponding to said plurality of speed sensors.

31. The deflated tire detector according to claim 28, wherein each of said speed sensors comprises a toothed wheel device.

32. The deflated tire detector according to claim 28, wherein said means for determining said correction factor LAT comprises:
means for calculating, from the four angular velocity values C1, C2, C3 and C4, respective first, second, third and fourth deciding factors (MC1, MC2, MC3, MC4) where MC1=C1
MC2=C2/[(C2+C4)/(C1+C3)]
MC3=C3/[(C3+C4)/(C1+C2)]
MC4=C4/[[((C2+C4)/(C1+C3)]×[(C3+C4)/(C1+C2)]];

means for summing the four deciding factors and outputting a sum;
means for multiplying said sum be a centralizing constant (K) to give a central deciding factor (MPSD); and
means for selecting the correction factor LAT as follows, if the first or second deciding factor MC1 or MC2 is greater than the central deciding factor (MPSD) then $$LAT=2\times(C3-C4)\times(C1+C2+C3+C4),$$

if the third or fourth deciding factor (MC3 or MC4) is greater than the central deciding factor (MPSD) then $$LAT=2\times(C1-C2)\times(C1+C2+C3+C4),$$

or if none of the deciding factors (MC1, MC2, MC3 or MC4) is greater than the central deciding factor (MPSD) then $$LAT=(C1+C3-C2-C4)\times(C1+C2+C3+C4).$$

33. The deflated tire detector according to claim 32, wherein the centralizing constant (K) has a value in the range 0.250125 to 0.250625.

34. The deflated tire detector according to claim 33, wherein the centralizing constant (K) has a value in the range 0.250250.

35. The deflated tire detector according to claim 32, further comprising means for calculating a deflation indicating factor IMC1, IMC2, IMC3, IMC4 for each wheel respectively and means for indicating the wheel having the numerically greater deflation indicating factor as being deflated, where the deflation indicating factors are calculated as follows:

IMC1=C1, then
if the first deciding factor MC1 is greater than the central deciding factor MPSD then
IMC2=C2/[((C4/C3)/2)+0.5]
IMC3=C3/[((C4/C2)/2)+0.5]
IMC4=C4/[[((C4/C3)/2)+0.5]×[((C4/C2)/2)+0.5]];
if the second deciding factor MC2 is greater than the central deciding factor MPSD then
IMC2=C2/[((C4/C3)/2)+0.5]
IMC3=C3/[((C3/C1)/2)+0.5]
IMC4=C4/[[((C4/C3)/2)+0.5×[((C3/C1)/2)+0.5]];
if the third deciding factor MC3 is greater than the central deciding factor MPSD then
IMC2=C2/[((C2/C1)/2)+0.5]
IMC3=C3/[((C4/C2)/2)+0.5]
IMC4=C4/[[((C2/C1)/2)+0.5]×[((C4/C2)/2)+0.5]];
if the fourth deciding factor MC4 is greater than the central deciding factor MPSD then
IMC2=C2/[((C2/C1)/2)+0.5]
IMC3=C3/[((C3/C1)/2)+0.5]
IMC4=C4/[[((C2/C1)/2)+0.5]×[((C3/C1)/2)+0.5]];
or if none of the deciding factors MC1, MC2, MC3, MC4 is greater than the central deciding MPSD factor then
IMC2=C2/[(((C2+C4)/(C1+C3 ))/2)+0.5 ]
IMC3=C3/[(((C3+C4)/(C1+C2))/2)+0.5]
IMC4=C4/[[(((C3+C4)/(C1+C2))/2)+0.5]×(((C2+C4)/(C1+C3))/2)+0.5 ]].

* * * * *